United States Patent
Hunter et al.

(10) Patent No.: US 10,669,022 B2
(45) Date of Patent: Jun. 2, 2020

(54) BEARING ARRANGEMENT AND AN AIRCRAFT

(71) Applicant: Sikorsky Aircraft Corporation, Stratford, CT (US)

(72) Inventors: David H. Hunter, Cheshire, CT (US); Eric Lucien Nussenblatt, Stamford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 175 days.

(21) Appl. No.: 15/754,530

(22) PCT Filed: Aug. 25, 2016

(86) PCT No.: PCT/US2016/048533
§ 371 (c)(1),
(2) Date: Feb. 22, 2018

(87) PCT Pub. No.: WO2017/035295
PCT Pub. Date: Mar. 2, 2017

(65) Prior Publication Data
US 2018/0237134 A1    Aug. 23, 2018

Related U.S. Application Data

(60) Provisional application No. 62/209,649, filed on Aug. 25, 2015.

(51) Int. Cl.
*B64C 27/605* (2006.01)
*B64C 27/10* (2006.01)
(Continued)

(52) U.S. Cl.
CPC ............ *B64C 27/605* (2013.01); *B64C 27/10* (2013.01); *B64C 27/46* (2013.01); *F16C 23/084* (2013.01);
(Continued)

(58) Field of Classification Search
CPC ........ B64C 27/605; F16C 27/02; F16C 27/04; F16C 27/08; F05D 2240/50;
(Continued)

(56) References Cited

U.S. PATENT DOCUMENTS 3,759,632 A    9/1973    Rybicki
4,688,732 A    8/1987    Jackson
(Continued)

OTHER PUBLICATIONS

PCT International Search Report and Written Opinion; International Application No. PCT/US2016/048533; International Filing Date: Aug. 25, 2016; dated Oct. 28, 2016; pp. 1-16.

*Primary Examiner* — Ninh H. Nguyen
*Assistant Examiner* — Behnoush Haghighian
(74) *Attorney, Agent, or Firm* — Cantor Colburn LLP

(57) ABSTRACT

A bearing arrangement for use with a structure defining an outer surface which expands and contracts inward and outward relative to the structure includes, a member having at least one inner surface to face the outer surface, and at least one protrusion extending from the inner surface, the at least one protrusion being biased toward and in contact with the outer surface and maintains contact as the structure expands and contracts.

13 Claims, 3 Drawing Sheets

(51) Int. Cl.
*F16C 27/04* (2006.01)
*F16C 23/08* (2006.01)
*F16C 35/073* (2006.01)
*B64C 27/46* (2006.01)
*F16C 27/08* (2006.01)
*B64C 27/72* (2006.01)
*F16C 19/28* (2006.01)
*F16C 27/02* (2006.01)

(52) U.S. Cl.
CPC .............. *F16C 27/04* (2013.01); *F16C 27/08* (2013.01); *F16C 35/073* (2013.01); *B64C 2027/7255* (2013.01); *F16C 19/28* (2013.01); *F16C 27/02* (2013.01); *F16C 2326/43* (2013.01); *F16C 2360/24* (2013.01); *Y02T 50/34* (2013.01)

(58) Field of Classification Search
CPC ........ F05D 2240/54; F05D 2300/5021–50212; F01D 25/16–164; F05B 2240/50; F05B 2240/54; F05B 2280/5003–50032; F04D 29/046; F04D 29/056
See application file for complete search history.

(56) References Cited

U.S. PATENT DOCUMENTS

| | | | |
|---|---|---|---|
| 4,872,617 A * | 10/1989 | Foresman | B02C 7/11 241/247 |
| 5,209,429 A | 5/1993 | Doolin et al. | |
| 5,624,232 A * | 4/1997 | Certain | B64C 27/605 416/114 |
| 5,785,497 A * | 7/1998 | White | B64C 27/32 403/67 |
| 7,338,384 B2 | 3/2008 | Patrascu et al. | |
| 7,585,153 B1 | 9/2009 | Schmaling et al. | |
| 7,828,482 B2 * | 11/2010 | Beausoleil | B22F 7/08 29/898.042 |
| 8,033,736 B2 * | 10/2011 | Habibvand | B64C 27/605 384/492 |
| 8,142,158 B2 | 3/2012 | Schmaling et al. | |
| 8,303,248 B2 | 11/2012 | Cabrera et al. | |
| 8,568,100 B2 | 10/2013 | Muylaert et al. | |
| 10,228,014 B2 * | 3/2019 | Ueda | F16C 33/122 |
| 2011/0039648 A1 | 2/2011 | Lannutti et al. | |
| 2013/0328284 A1 | 12/2013 | Byrnes | |

* cited by examiner

BEARING ARRANGEMENT AND AN AIRCRAFT

CROSS REFERENCE TO RELATED APPLICATIONS

This application is a National Stage application of PCT/US2016/048533, filed on Aug. 25, 2016, which claims priority from U.S. Provisional Application Ser. No. 62/209,649, filed, Aug. 25, 2015, the contents of which are incorporated by reference in their entirety herein.

BACKGROUND

Bearing assemblies that perform in extreme environments often have clearances between moving parts that varies as a result of dimensional changes of the components involved. New methods and apparatus that minimize or eliminate clearance are always of interest to those who practice in the art.

BRIEF DESCRIPTION

Disclosed herein is a bearing arrangement for use with a structure defining an outer surface which expands and contracts inward and outward relative to the structure. The bearing arrangement includes, a member having at least one inner surface to face the outer surface, and at least one protrusion extending from the inner surface, the at least one protrusion being biased toward and in contact with the outer surface and maintains contact as the structure expands and contracts.

In addition to one or more of the features described above, or as an alternative, in further embodiments the bias of the at least one protrusion is via at least one thinned down portion connecting the at least one protrusion and the member.

In addition to one or more of the features described above, or as an alternative, in further embodiments the at least one thinned down portion is radially thinned down.

In addition to one or more of the features described above, or as an alternative, in further embodiments the at least one thinned down portion deforms elastically more than the member or the protrusion.

In addition to one or more of the features described above, or as an alternative, in further embodiments the at least one thinned down portion comprises a slot on at least one perimetrical side of a connection between the at least one protrusion and the member which decreases a perimetrical dimension of the thinned down portion relative to the member at the at least one protrusion.

In addition to one or more of the features described above, or as an alternative, in further embodiments the at least one protrusion has a convex radial surface facing the outer surface.

In addition to one or more of the features described above, or as an alternative, in further embodiments portions of the at least one protrusion along the convex radial surface which contact the outer surface changes as dimensions of the structure and the member change.

In addition to one or more of the features described above, or as an alternative, in further embodiments the at least one protrusion includes a surface treatment configured to reduce friction when moving while in contact with the outer surface.

In addition to one or more of the features described above, or as an alternative, in further embodiments some of the at least two of the at least one protrusion are disposed on opposing ends of the member.

In addition to one or more of the features described above, or as an alternative, in further embodiments the member includes a spherical surface connectable to a portion of a control mechanism.

Further disclosed herein an aircraft comprising a control mechanism, a standpipe, and the bearing arrangement of any of the foregoing embodiments, wherein the bearing arrangement is between the standpipe and the control mechanism.

In addition to one or more of the features described above, or as an alternative, in further embodiments the control mechanism is a swashplate.

In addition to one or more of the features described above, or as an alternative, in further embodiments a plurality of rotor blades are in operable communication with the swashplate.

In addition to one or more of the features described above, or as an alternative, in further embodiments an engine is in operable communication with the swashplate Further disclosed herein is an aircraft. The aircraft includes, a fuselage, an engine in operable communication with the fuselage, a plurality of rotors in operable communication with the engine, a control mechanism in operable communication with the engine, and a bearing arrangement according to any of the foregoing embodiment in operable communication with the control mechanism and the plurality of rotors.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
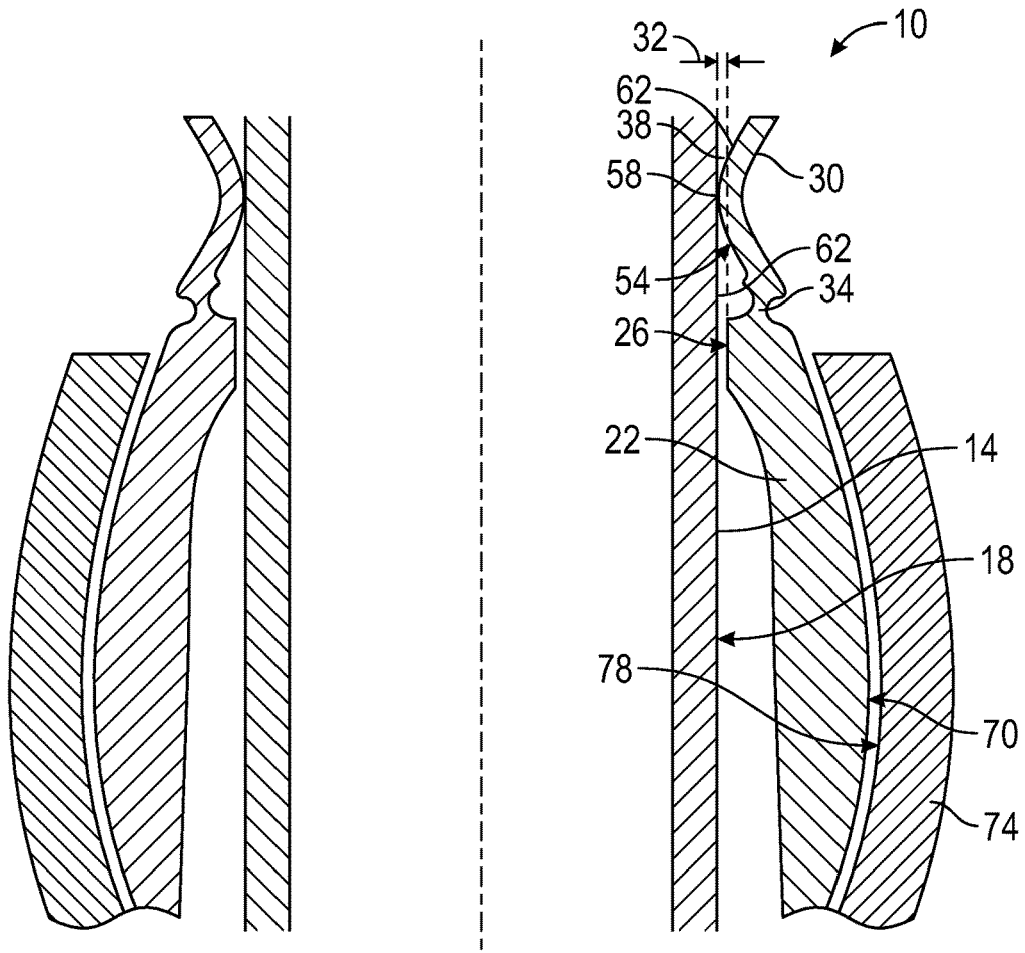
FIG. 1 depicts a partial sectioned view of a bearing arrangement disclosed herein.
Figure 2:
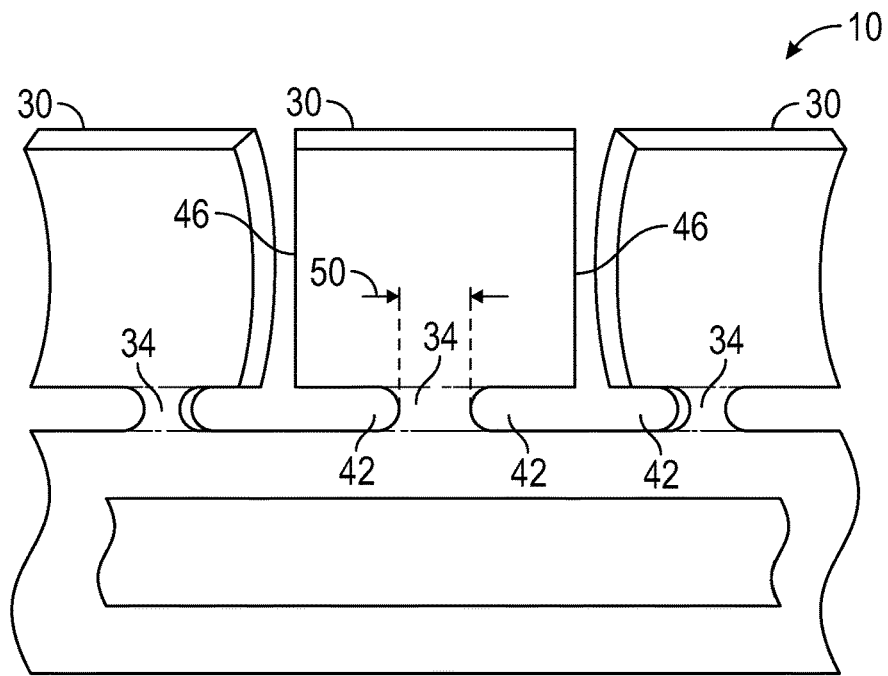
FIG. 2 depicts a partial side view of the bearing arrangement of FIG. 1.

Referring to FIGS. 1 and 2, an embodiment of a bearing arrangement disclosed herein is illustrated at 10. The bearing arrangement 10 is usable with a structure 14, having a tubular shape, defining an outer radial surface 18. The bearing arrangement 10 includes a member 22 having an inner radial surface 26 facing the outer radial surface 18. The member 22 has at least one protrusion 30, with a plurality being shown, extending longitudinally from the member 22 beyond the inner radial surface 26. Further the protrusions 30 are biased toward and are in contact with the outer radial surface 18 throughout at all dimensional variations of the structure 14 and the member 22, including radial dimensions that vary with temperature changes of the structure 14 and the member 22. As such, regardless of the physical parameters of the materials employed for the structure 14 and the member 22, the protrusions 30 are configure to have sufficient movement to maintain contact with the outer radial surface 18 even at extremes of dimensional changes of the structure 14 and the member 22. A radial gap 32 exists between the inner radial surface 26 and the outer radial surface 18. The size of the radial gap 32 varies with temperature changes of the structure 14 and the member 22. Contact forces between the protrusions 30 and the outer radial surface 26 in one embodiment are set to maintain the member 22 concentric with the structure 14 regardless of the size of the radial gap 32. While shown with multiple protrusions 30, it is understood that the member 22 could have a single protrusion 30 which extends around the structure 14 in other aspects. While shown as tubular, it is understood that aspects of the invention can be non-tubular, and such where the structure has a non-circular or rectilinear cross section.

A thinned down portion 34 of the member 22 between the protrusions 30 and the inner radial surface 26 acts as a spring and deforms elastically to bias the protrusions 30 toward the outer radial surface 18. The inner radial surface 26 of the member 22 is curved and is substantially concentric with the structure 14. Also, the portions 38 of the protrusions 30 that are in contact with the outer radial surface 18 may be curved and concentric with the structure 14 as well. While the thinned down portion 34 can be curved and essentially coaxial with the inner radial surface 26, in one embodiment the thinned down portion 34 may be straight. Being straight allows the thinned down portion 34 to flex more easily than if the thinned down portion 34 were to have an arcuate shape. In one embodiment the thinned down portion 34 is also shorter perimetrically than the protrusions 30. This is due to slots 42 formed in the thinned down portions 34 from the opposing perimetrical edges 46 of the protrusions 30, thereby making the thinned down portion 34 have a smaller perimetrical dimension 50 than the protrusions 30.

In one embodiment the protrusions 30 include a longitudinally convex radial surface 54 that faces the outer radial surface 18. This convex curvature is best seen in FIG. 1. The point of contact 58 between the protrusions 30 and the outer radial surface 18 varies along the longitudinally convex radial surface 54 as the size of the radial gap 32 is altered due to, for example, changes in temperature of the structure 14 and the member 22 which causes the structure 14 to expand towards the member 22. Varying the point of contact 58 allows for wear of the protrusions 30 to be spread out over the longitudinally convex radial surface 54. In some embodiments a surface treatment 62 can be applied to the longitudinally convex radial surface 54 and/or the outer radial surface 18 to, for example, decrease friction and possible wear at the point of contact 58. The surface treatment 62 in one embodiment may be a coating.

Figure 3:
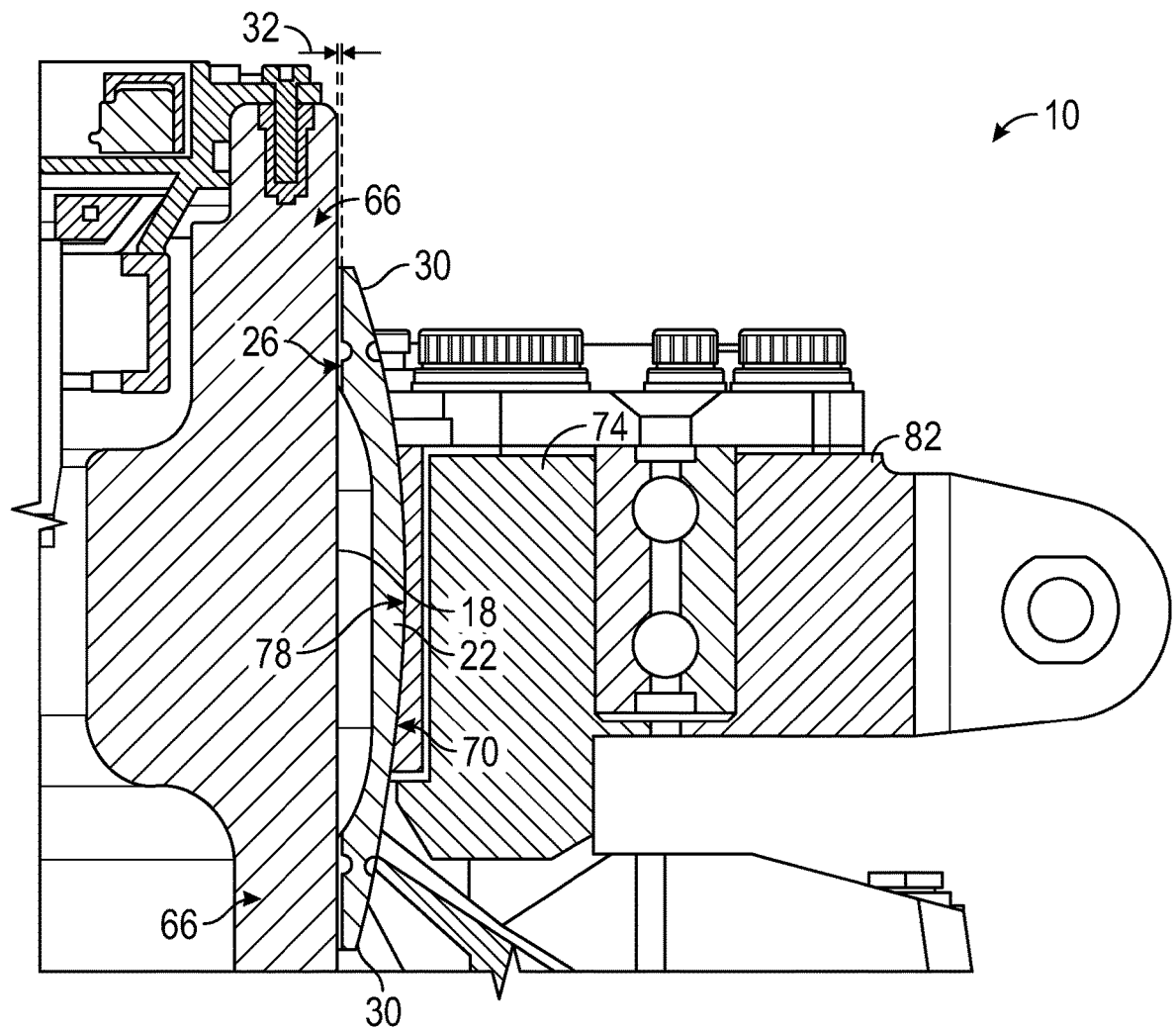
FIG. 3 depicts another partial sectioned view of the bearing arrangement of FIG. 1.

Referring to FIG. 3, an embodiment of the bearing arrangement 10 is illustrated that includes a plurality of the protrusions 30 disposed on opposing ends 66 of the member 22, which is shown as a uniball bearing. Such an arrangement provides centering of the member 22 at the two opposing ends 66 regardless of a size of the radial gap 32 between the inner radial surfaces 26 and the outer radial surface 18. In one embodiment the member 22 includes an outer spherical surface 70. A first control mechanism 74, illustrated in one embodiment herein as a swashplate, includes an inner spherical surface 78 that is complementary to and rides on the outer spherical surface 70 while a second swashplate 82 is rotationally disposed relative to the first swashplate 74. The shown outer radial surface 18 is a surface of a stand pipe in the rotary wing aircraft 86 (FIG. 4).

Figure 4:
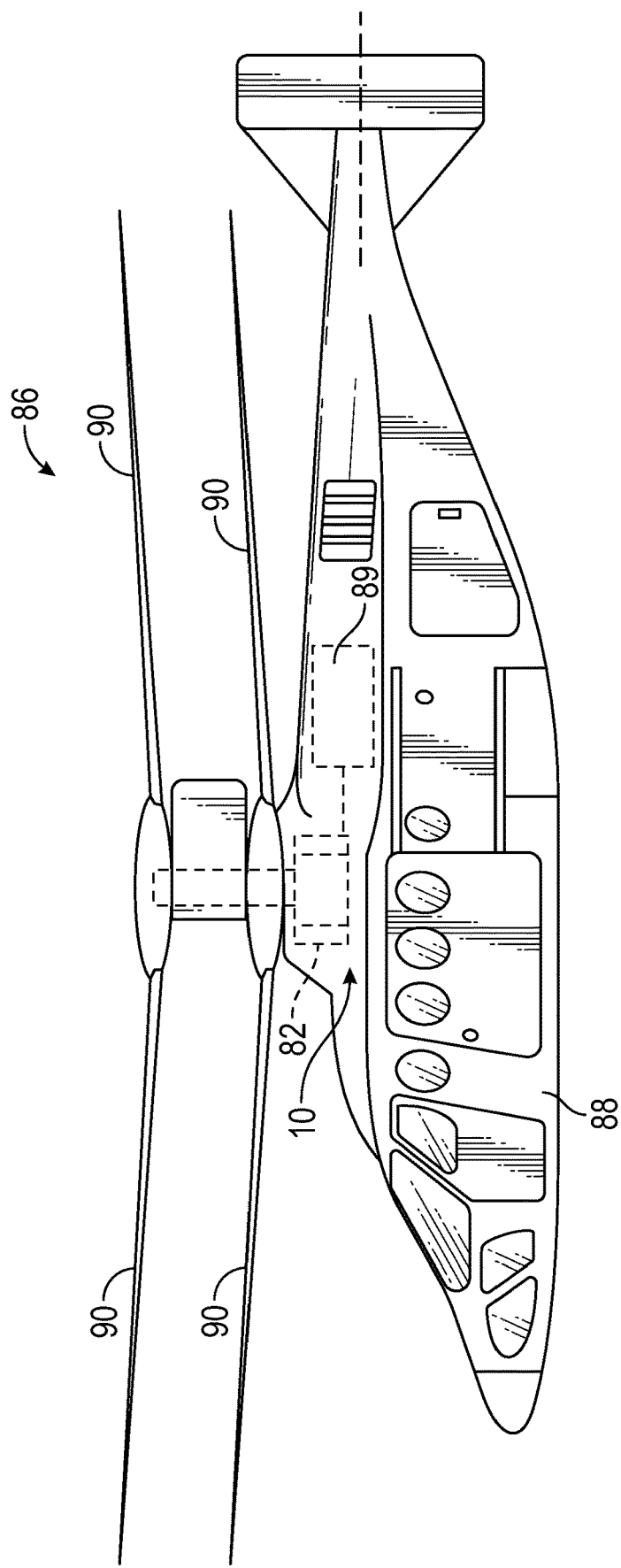
FIG. 4 depicts an aircraft employing the bearing arrangement of FIG. 1.

Referring to FIG. 4, an embodiment of a rotary wing aircraft 86 is illustrated employing the bearing arrangement 10 disclosed herein. The aircraft 86, among other things includes a fuselage 88, an engine 89 and a plurality of rotor blades 90. The second swashplate 82 is driven by the engine 89 and is connected to the rotor blades 90 and controls collective as well as cyclic pitch of the rotor blades 90.

While the disclosure has been described with reference to an exemplary embodiment or embodiments, it will be understood by those skilled in the art that various changes may be made and equivalents may be substituted for elements thereof without departing from the scope of the disclosure. By way of example, while described in terms of a bearing used in a rotary wing aircraft, it is understood that aspects of the invention can be used in other types of aircraft, in industrial machinery, in maritime machinery, locomotive and automobile applications, and the like. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the claims. Also, in the drawings and the description, there have been disclosed exemplary embodiments of the disclosure and, although specific terms may have been employed, they are unless otherwise stated used in a generic and descriptive sense only and not for purposes of limitation, the scope of the disclosure therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A bearing arrangement for use with a structure, the structure having an outer surface, the bearing arrangement comprising:
   a member having at least one inner surface to face the outer surface of the structure; and
   at least one protrusion extending from the inner surface of the member, the at least one protrusion being biased toward and in contact with the outer surface of the structure and maintaining contact with the structure as the structure expands and contracts, the at least one protrusion having a convex radial surface facing the outer surface of the structure; and
   at least one thinned down portion connecting the at least one protrusion and the member, wherein the bias of the at least one protrusion is provided via the thinned-down portion.

2. The bearing arrangement of claim 1, wherein the at least one thinned down portion is radially thinned down.

3. The bearing arrangement of claim 1, wherein the at least one thinned down portion deforms elastically more than the member or the protrusion.

4. The bearing arrangement of claim 1, wherein the at least one thinned down portion comprises a slot on at least one perimetrical side of a connection between the at least one protrusion and the member which makes in the thinned down portion have a smaller perimetrical dimension relative to the at least one protrusion.

5. The bearing arrangement of claim 1, wherein portions of the at least one protrusion along the convex radial surface which contact the outer surface changes as dimensions of the structure and the member change.

6. The bearing arrangement of claim 1, wherein the at least one protrusion includes a surface treatment configured to reduce friction when moving while in contact with the outer surface.

7. The bearing arrangement of claim 1, further comprising another protrusion disposed on the member on an opposing end from the at least one protrusion.

8. The bearing arrangement of claim 1, wherein the member includes a spherical surface connectable to a portion of a control mechanism.

9. An aircraft comprising a control mechanism, a standpipe, and the bearing arrangement of claim 1, wherein the bearing arrangement is between the standpipe and the control mechanism.

10. The aircraft of claim 9, wherein the control mechanism is a swashplate.

11. The aircraft of claim 10, wherein a plurality of rotor blades are in operable communication with the swashplate.

12. The aircraft of claim 10, further comprising an engine in operable communication with the swashplate.

13. An aircraft comprising:
a fuselage;
an engine in operable communication with the fuselage;
a plurality of rotors in operable communication with the engine;
a control mechanism in operable communication with the engine; and
a bearing arrangement according to claim 1 in operable communication with the control mechanism and the plurality of rotors.

* * * * *